June 4, 1968 W. F. W. GRUNEWALD ET AL 3,386,130
EMBOSSING ROLL, IN PARTICULAR FOR THE TREATMENT
OF WEBS OF THERMOPLASTIC MATERIAL
Filed March 28, 1966 2 Sheets-Sheet 1

INVENTORS:
WALDEMAR F.W. GRÜNEWALD
JOHANNES PEILER
by Jacob L. Kollin
ATTORNEY

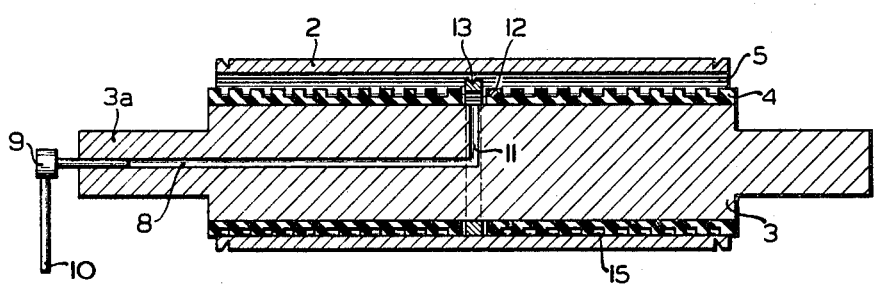

United States Patent Office 3,386,130
Patented June 4, 1968

3,386,130
EMBOSSING ROLL, IN PARTICULAR FOR THE TREATMENT OF WEBS OF THERMOPLASTIC MATERIAL
Waldemar F. W. Grunewald, Monchen-Gladbach, and Johannes Peiler, Krefeld, Germany, assignors to Firma Dornbusch & Co., Krefeld, Germany
Filed Mar. 28, 1966, Ser. No. 538,047
5 Claims. (Cl. 18—10)

ABSTRACT OF THE DISCLOSURE

A solid shaft has an outer sleeve of resilient material permanently secured to its outer wall. An embossing roll of a larger diameter than the sleeve and open on both ends is freely rotatable about the shaft. An auxiliary, parallel counter roll, provided with a resilient sleeve presses against, and transmits its rotation to the embossing roll.

The solid shaft is additionally provided with passages for cooling liquid communicating with the space formed between the shaft and the embossing cylinder.

The elastic sleeve may be further provided with a central circumferential slit and with a series of grooves. A cut-off ring is provided in the circular slit.

---

The invention relates to an embossing roll for manipulating of thermoplastic material webs, which comprises a thin-walled embossing tube and a driven support shaft having a hollow space with a crescent-shaped cross-section adapted for the passage of cooling medium.

An embossing roll of this type leaves free a greater hollow space than known thick-walled embossing rolls. It is thus possible to pump a correspondingly large quantity of cooling water through the embossing roll and to cool thoroughly the material web traveling over said roll.

In a known construction, the embossing roll and the supporting shaft extending therethrough contact one another with their metal surfaces which must be finished to achieve a deep emplacement of the embossing roll. For this reason, only an unsatisfactory, slight frictional adhesion of the embossing roll with the supporting shaft is possible and expensive special devices are required to insure the embossing roll against axial displacement of a supporting shaft. Furthermore, the drive of the embossing roll presents certain difficulties. Due to only a slight frictional adherence, insurmountable slippage of the supporting shaft cover is produced. In addition, the machining of the relief-like embossing design in the cover surface of the prohibitively thin-walled embossing roll presents technical difficulties.

The invention overcomes this disadvantage by providing an elastically yieldable sleeve for the supporting shaft.

As practical experience has demonstrated, the elastically yieldable supporting shaft sleeve provides an excellent frictional adhesion between the embossing cylinder and the supporting shaft. The embossing cylinder need not therefore be secured against axial displacement on the supporting shaft and may be mounted without slipping or turning on the latter. Surprisingly, a slipless and completely smooth travel of the embossing cylinder on the supporting shaft takes place at relatively high speeds.

Surprisingly, it has been further discovered that when using a supporting shaft with an elastically yieldable sleeve it is possible to form any desired relief design, mechanically, on an originally smooth outer surface of the embossing cylinder, using the Molettier method.

A further advantage of the invention is that it makes it possible to employ a metal of higher heat conductivity than copper or aluminum, for the embossing cylinder.

Such a material, for example, fine steel or a similar metal, could not be used for embossing rolls of known construction, due to its relatively slight rigidity.

An embossing cylinder of this type may be fashioned in such a comparatively simple manner, that the formation of the relief profile on its substantially larger surface costs about the same as the profiling of the surface of an embossing roll of ordinary construction, made of fine steel.

According to another feature of the invention, the elastic sleeve of the supporting shaft of the embossing cylinder is provided with a plurality of circular grooves, extending towards the sleeve's ends. This arrangement of the circular grooves provides the advantage of yielding in a substantial measure to the load pressure on the embossing cylinder, from the center to both ends, through an elastic deformation. A slight bending of the supporting shaft, which takes place at a high load pressure, is thereby equalized.

The supporting shaft for the embossing cylinder is advantageously provided with a central axial bore and a radial bore associated therewith for letting in cooling liquid in the crescent-shaped hollow space between the supporting shaft's sleeve and the embossing roll. This liquid can emerge freely from both ends of the embossing roll and be led away. The radial bore may, for example, open into a circular slit of the supporting sleeve, in which is emplaced with clearance, a cut-off ring of about the thickness of the supporting shaft's sleeve, but of larger inner and outer diameters than the latter. The cut-off ring thereby assumes an eccentric position relative to the supporting shaft's sleeve and is only in contact with the latter at that point where the embossing cylinder lies on the supporting shaft. When the opening of the above mentioned radial bore reaches the circular ring at this point, during the supporting shaft's rotation, the cut-off ring covers this opening, while when in any other angular positions of the radial bore the ring leaves the radial bore uncovered.

The drawing illustrates an embodiment of the invention. In the drawing:

FIG. 3 is an embossing roll similar to that of FIG. 1, but of modified construction.

Figure 1:
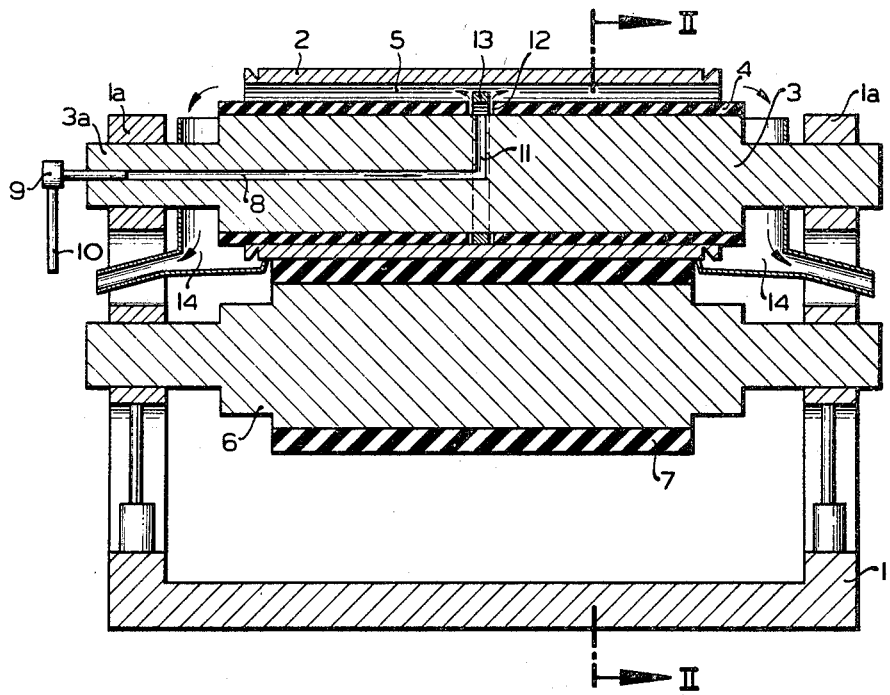
FIG. 1 is an elevational cross-section, through a pair of embossing and counter rolls and their supports.
Figure 2:
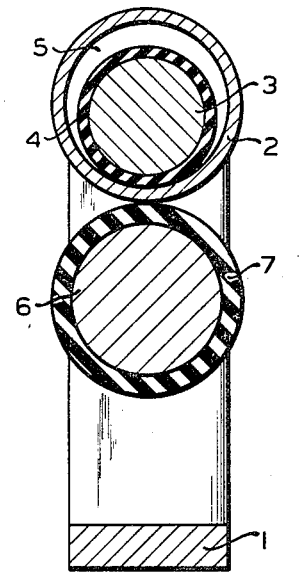
FIG. 2 is a cross-section taken on line II—II of FIG. 1.

An embossing roll and, below it, a counter roll are mounted rotatably on the bearing supports 1a of the fixed machine frame 1 and are provided with drive means (not shown). The embossing roll consists of a relatively thin embossing cylinder 2 and a bend-resistant supporting shaft 3 with a resiliently yielding sleeve 4, which may be made of rubber, and which extends through it. A hollow space 5, of crescent-like cross-section is formed between the supportingg shaft's sleeve 4 and embossing cylinder 2, which is freely rotatable and is eccentrically supported on the former. A cooling liquid is directed through this hollow space which is open on both ends, in a manner to be described below.

The counter roll disposed below the emobssing roll 2, 3 consists of a bend-resistant cylinder core and an elastic resilient sleeve 7 secured non-rotatably thereon and which is made of rubber or of a rubber-like substance, similar to the sleeve 4 of the supporting shaft. While cast iron or forged steel are preferably considered for the supporting shaft 3 and the core 6 of the conuter roll 6, 7, the seamless embossing cylinder is made advantageously of a metal which is softer and is of a higher heat conductivity, such as copper or aluminum.

A central axial bore 8 in the supporting shaft 3, and extending from the trunnion 3a of the shaft to its center, is connected to a cooling medium pipe at 9, in known manner. A radial bore 11, communicating with the axial bore 8, opens into a circular slit 12 of the supporting shaft's sleeve. A cut-off ring 13 is seated, eccentrically, with clearance, in the slit 12, the ring being of about the same thickness as the supporting shaft sleeve 4, but of larger inner and outer diameters than that of the jacket.

The cooling medium arriving from the pipe 10 flows in the direction of the arrow, through the connection 9 and the bores 8 and 11, into the hollow space 5, between the embossing cylinder 2 and supporting shaft 4 and flows out freely from both sides of the hollow space 5. The cooling medium reaches the collecting cups 14, secured to supports 1a of the frame 1 and through these cups to a desired location (FIG. 1). By way of example, the cooling medium may reach a sump and thence, by means of a circulating pump, may be forced again into the feed pipe 10 through a spray cooler or the like.

As may be seen in the drawing, the embossing cylinder 2, is supported on the elastically yieldable sleeve 7 of the counter roll 6, 7 with its cylindrical inner surface on the similar, elastically yieldable sleeve 4 of the supporting shaft 3 of a relatively large cross-section. This condition, required for a quiet rotation and a good frictional adhesion of the embossing cylinder and the supporting shaft's sleeve 4, is assured, further, when the embossing cylinder 2 has a substantially larger or, contrarywise, smaller inner diameter than the illustrated embodiment. Furthermore, the embossing cylinder may be substantially longer or shorter than that shown in FIG. 1. It is thus possible to provide, always, the same supporting shaft 3 with an elastic sleeve 4 for all embossing cylinders required in practice and it is only necessary to change the corresponding embossing cylinders when transfering from one design to another.

Above all, however, the invention ensures the heretofore unachievable possibility of rotating the embossing roll 2–4 and the counter roll 6, 7 at such a high speed, that a material web of thermoplastic substance arriving from a series connected drawing calender may travel, without a decrease in speed through the gap between both above-mentioned rolls.

In the embodiment according to FIG. 3, the elastic sleeve 4, of the embossing roll 2–4 is provided with further circular grooves 15, extending towards both ends, in addition to the central circular slit 12 into which opens the radial bore 11. While the circular slit 12 serves to recive the cut-off ring 13, eccentrically and without side play, the circular grooves remain open and extend in increasing depths towards the trunnion 3a. The provision of circular grooves 15 ensures an advantage, in that the elastic sleeve 4, counting from the center, can yield in increasing measure, to the imposed pressure of the embossing cylinder 2, due to elastic deformation. A slight bending of the bend-resistant supporting shaft, resulting from the load pressure is thereby equalized.

We claim:

1. In an embossing machine, in combination, a machine frame, two pairs of upper and lower, spaced, oppositely aligned, bearing supports in said frame, a first solid shaft rotatably mounted in the upper of said supports, a first sleeve of resilient, yielding material secured about said first shaft, an embossing cylinder of a larger diameter than the sleeve mounted freely rotatable about said sleeve and presenting with said first sleeve a crescent-shaped hollow cross-sectional space open on both ends therebetween and a counter roll rotatably mounted in the lower of said supports, the outer face of said counter roll engaging with the outer face of said embossing cylinder, said first sleeve being provided with a centrally disposed circular slit, a cut-off ring displaceable in said slit, said ring being of substantially the thickness of said first sleeve and of larger inner and outer diameters than said first sleeve, said first shaft having a radial bore opening into said slit and an axial bore communicating with said radial bore, and means for supplying cooling liquid through said bores into said crescent-shaped space.

2. In an embossing machine according to claim 1, said first sleeve being further provided with a plurality of spaced circular grooves extending from said central slits in increasing depth, towards the ends of said first sleeve.

3. In an embossing machine according to claim 1, said counter roll comprising a second shaft rotatably mounted in the lower of said pairs of supports, a second sleeve of resilient yielding material secured about said second shaft.

4. In an embossing machine according to claim 1, liquid collecting cups secured adjacent said upper bearing supports for collecting the cooling liquid emerging from said crescent-shaped space, said cups being adapted to conduct the cooling liquid to a sump pump.

5. In an embossing machine, in combination, a machine frame, two pairs of upper and lower, spaced, oppositely aligned, bearing supports in said frame, a first solid shaft rotatably mounted in the upper of said supports, a first imperforate sleeve of resilient, yielding material secured about said first shaft, an embossing cylinder of a larger diameter than the sleeve mounted freely rotatable about said sleeve and presenting with said first sleeve a crescent-shaped hollow cross-sectional space open on both ends therebetween and a counter roll rotatably mounted in the lower of said supports, the outer face of said counter roll engaging with the outer face of said embossing cylinder, and means for passing cooling liquid through said crescent-shaped space, for cooling a material web traveling over said embossing cylinder.

References Cited

UNITED STATES PATENTS

| | | |
|---|---|---|
| 2,908,964 | 10/1959 | Appenzeller. |
| 3,004,289 | 10/1961 | Missbach _____ 18—10 X |
| 3,129,457 | 4/1964 | Carter et al. _____ 18—10 X |
| 3,200,441 | 8/1965 | Geier _____ 18—9 |

FOREIGN PATENTS

| | | |
|---|---|---|
| 683,021 | 3/1964 | Canada. |
| 968,938 | 9/1964 | Great Britain. |

WILLIAM J. STEPHENSON, *Primary Examiner.*